United States Patent
Malmkvist et al.

(10) Patent No.: US 6,678,736 B1
(45) Date of Patent: Jan. 13, 2004

(54) RESOURCE OPTIMIZATION FUNCTION IN A DATA AND TELECOMMUNICATIONS SYSTEM

(75) Inventors: Jonas Malmkvist, Trangsund (SE); Stefan Sandell, Haninge (SE)

(73) Assignee: Telia AB, Farsta (SE)

( * ) Notice: Subject to any disclaimer, the term of this patent is extended or adjusted under 35 U.S.C. 154(b) by 0 days.

(21) Appl. No.: 09/530,579

(22) PCT Filed: Oct. 30, 1998

(86) PCT No.: PCT/SE98/01975

§ 371 (c)(1),
(2), (4) Date: Aug. 29, 2000

(87) PCT Pub. No.: WO99/22575

PCT Pub. Date: May 14, 1999

(30) Foreign Application Priority Data

Nov. 4, 1997 (SE) ................................................ 9704020

(51) Int. Cl.[7] .............................................. G06F 15/16
(52) U.S. Cl. ...................................... 709/231; 709/234
(58) Field of Search ............................... 709/231, 234

(56) References Cited

U.S. PATENT DOCUMENTS

| | | | | |
|---|---|---|---|---|
| 5,481,537 A | * | 1/1996 | Crisler et al. .................. 370/84 |
| 6,031,827 A | * | 2/2000 | Rikkinen et al. ............. 370/330 |
| 6,038,214 A | * | 3/2000 | Shionozaki .................. 370/230 |
| 6,058,113 A | * | 5/2000 | Chang ......................... 370/390 |
| 6,067,383 A | * | 5/2000 | Taniguchi et al. ........... 382/240 |
| 6,353,616 B1 | * | 3/2002 | Elwalid et al. .............. 370/443 |

FOREIGN PATENT DOCUMENTS

| | | |
|---|---|---|
| EP | 0 478 190 | 4/1992 |
| EP | 0 535 860 | 4/1993 |

OTHER PUBLICATIONS

Jon Crowcroft, "Hierarchical Coding," Hypertext http://www.cs.ucl.ac.uk/staff/j.crowcroft/mmbook/book/node119.html, Dec. 3, 1998.*

* cited by examiner

*Primary Examiner*—Patrice Winder
*Assistant Examiner*—Liang-Che Alex Wang
(74) *Attorney, Agent, or Firm*—Oblon, Spivak, McClelland, Maier & Neustadt, P.C.

(57) ABSTRACT

A method at a telecommunications system and a data communications system configured to adapt a resource reservation protocol for fixed networks to radio networks with a large variation in bandwidth and quality. Using a method of hierarchical coding, a data stream is divided into separate data streams with different priorities. Using the resource reservation protocol, resources in the fixed network for the data streams are reserved. A node in the fixed network shunts the data streams according to a pre-decided priority as the transmission capacity of the node decreases. Thus, if the transmission capacity at the node decreases and the quality requirement of a data stream cannot be maintained, the data stream in question is shunted. Upon shunting, the node transmits a message instructing upstream nodes to update their resource reservations; use the reserved resource temporarily for other traffic; and shunt the data stream until otherwise instructed.

7 Claims, 1 Drawing Sheet

RESOURCE OPTIMIZATION FUNCTION IN A DATA AND TELECOMMUNICATIONS SYSTEM

BACKGROUND OF THE INVENTION

1. Field of the Invention

The present invention relates to a method at a data and telecommunications system for transmission of data streams between a receiving terminal and a transmitting terminal via at least one fixed network including just any to number of nodes and another network consisting of links with large variation in bandwidth and quality, at which a resource reservation protocol reserves resources in said fixed network for said data streams.

2. Background Art

A computer transmits data over a network to a receiving computer. At hierarchical coding, a data stream (with real time requirements, i.e. demands on controlled delay) is divided into separate data streams with different priorities. The data streams have different demands on quality. By a resource reservation protocol, resources then are reserved in the network for the data streams. Separate reservations are made for each data stream in all nodes from the receiver to the transmitter. At hierarchical coding, the node shunts data streams according to a predefined priority as the transmission capacity of the node, has decreased. Since the data streams have real time demands, data will not be buffered.

When hierarchical coding is used over a radio channel with large variation in bandwidth and quality, the number of data streams which can be transmitted over the radio channel will vary rapidly. The radio channel is the transmission link which in most cases will set a limit to the number of data streams that can be transmitted to the receiver. The data streams that are stopped at the node closest to the radio channel are still transmitted in the fixed network and therefore load the fixed network without due cause. At the same time, the receiver wants to keep its reservations in the network during the time when some data streams are stopped, because the reservation may not be possible to be retrieved if it is deleted. For unicast traffic, i.e. one receiver of data streams and separate resource reservations for each receiver, it is possible to signal to the transmitter to stop the transmission of a data stream. For multicast traffic, i.e. a plurality of receivers of the same data streams, resources are reserved in nodes with data streams in common. Thus, the transmitter cannot stop the transmission of any particular data stream since all other receivers then should be affected.

The aim of the present invention consequently is to solve this problem and provide multicast traffic without loading the fixed network without due cause.

SUMMARY OF THE INVENTION

This aim is achieved by a method of transmitting data streams between a receiving terminal and a transmitting terminal via at least one fixed network including any number of nodes and via another network consisting of links with a large variation in bandwidth and quality. The invention includes a resource reservation protocol that reserves resources in said fixed network for said data streams. The protocol includes monitoring if the transmission capacity of a node decreases and falls below the quality requirements of a specific data stream. If so, the specific data stream is shunted, , whereupon said node transmits a message which is executed in all nodes in said fixed network so that resource reservations are then provided to said transmitting terminal for other subscribers. The message results in the networks:
updating said resource reservation for said specific data stream;
utilizing said resource reservation temporarily for other traffic;
shunting said specific data stream until further notice.

The invention shows a plurality of advantages in comparison with known technology. For instance, the fixed network will, with this resource optimization function, have a considerable capacity improvement since the network will not be loaded by data which in any case is shunted at the downstream node lacking capacity.

The receiver will not lose its resource reservations during the time a data stream is stopped, which can happen if the receiver has to make new resource reservations each time the number of data streams is changed.

Resources which in other cases would not be utilized during the time a data stream is momentarily stopped, now can be utilized.

With multicast traffic, data will be shunted in a node as close to the transmitter as possible, without other receivers of the multicast traffic being affected. Further characteristics of the present invention are given in the sub-claims.

BRIEF DESCRIPTION OF THE DRAWINGS

In the following a detailed description of an embodiment of the invention is given, with reference to the enclosed drawings, of which.

DETAILED DESCRIPTION OF AN EMBODIMENT OF THE INVENTION

Figure 1:
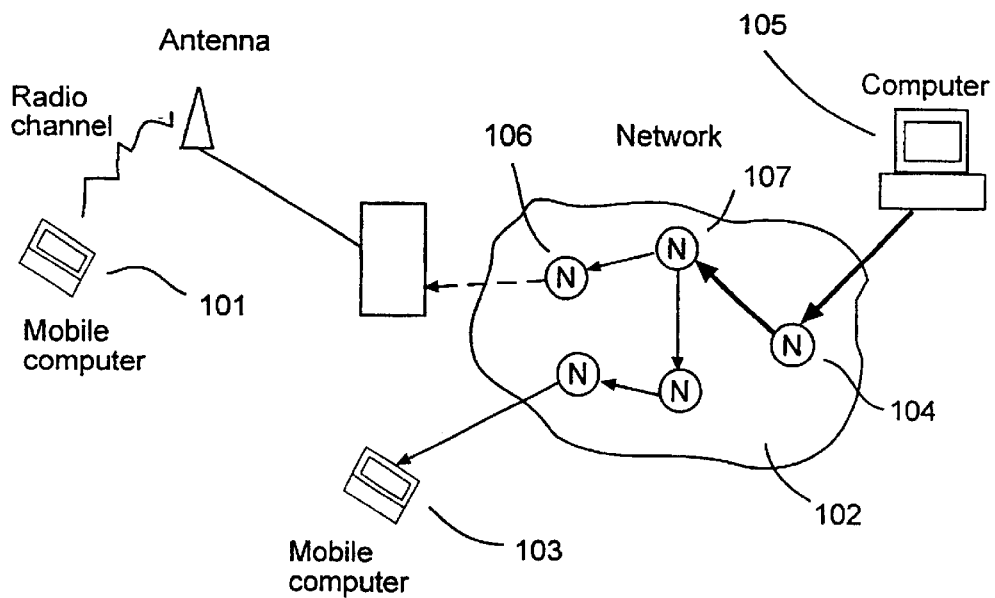
FIG. 1 is a diagrammatical presentation of the tele and data communications system according to the invention.

FIG. 1 shows a mobile computer, 101, connected to a fixed network, 102, consisting of nodes (N) via a radio channel with varying quality. The dashed arrow shows data streams which are transmitted to the mobile node 101. The bold arrow shows data streams which are in common for all receivers 101 and 103.

The mobile computer 101 can receive unicast traffic and multicast traffic. At unicast traffic, the nodes deal with the resource reservations of the data streams separately. At multicast traffic, the nodes deal with the resource reservations in common when the data streams are in common for all receivers 101 and 103. In FIG. 1, the node 104, closest to the transmitter 105, deals with the resource reservations in common.

The invention is primarily intended for the functionality in the node 106 at the entrance of the radio network, and in the nodes 104 and 107 which the data streams pass on the path from the transmitter 105, i.e. the computer, to the receiver 101, i.e. the mobile computer.

The functionality adapts resource reservation protocols created for fixed networks 102 to networks consisting of links with larger variations in bandwidth and quality, preferably radio networks. Previously known technology does not deal with resource optimization at resource reservations and hierarchical coding over links with varying quality.

Theoretically, the resource optimization function solves the network utilization problem at hierarchical coding, both for unicast traffic and multicast traffic.

If the transmission capacity at a node (in most cases the node 106 at the radio channel), see FIG. 1, decreases, and the quality requirement of a data stream is no longer maintained, then the data stream in question will be shunted. After that the node transmits a message to the nodes (where the resource reservations are) in the direction of the transmitter 105 (the computer in FIG. 1) with the following content:

Update the resource reservation for the data stream, i.e. keep the resourse reservations that are required to transmit the data stream.

Use the reserved resource temporarily for other traffic.

Shunt the lowest priority data stream until further notice.

If the transmission capacity in the node increases, and the quality requirement for a data stream is fulfilled, the data stream may be transmitted again. The node then transmits a message to the nodes (where the resource reservations are) in the direction of the transmitter 105 with the following content:

Update the resource reservation for the data stream, i.e. keep the resourse reservations that are required for transmission of the data stream.

Use the reserved resource for the originally intended data stream.

Both unicast and multicast traffic may be controlled with the same signalling message. With multicast traffic, resource reservations which are in common for a plurality of receivers 101 and 103 will not be affected.

Figure 2:
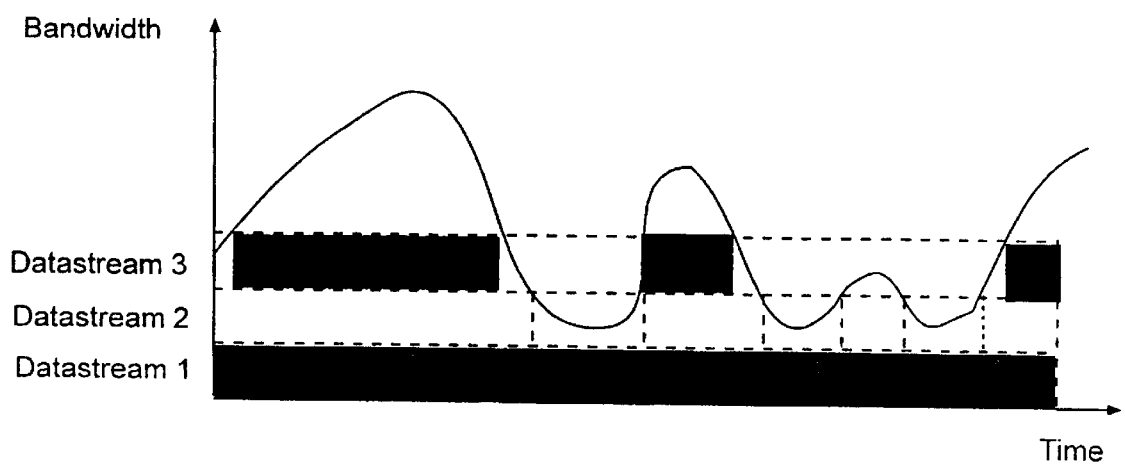
FIG. 2 is a diagrammatical presentation of a graph related to hierarchical coding according to the present invention.

FIG. 2 shows the internal priority of the data streams, where the data stream 1 has the highest priority and is not limited in time by bandwidth fluctuations.

Data streams 3 are strongly affected in time by the bandwidth fluctuation. The data streams consequently are hierarchically coded, where data stream 1 is highest in the hierarchy.

In the following an example is given of a conceived scenario:

Mobile computer 101 receives data with real time demands (controlled delay) from a transmitting computer 105 (FIG. 1).

The mobile computer 101 selects to receive the data stream in a plurality of data streams with different priorities (FIG. 2).

At each node resources are reserved separately for each data stream.

The node 106 closest to the radio channel receives real-time information about the transmission capacity that is available over the downstream radio channel. If bandwidth decreases, the node 106 closest to the radio channel is forced to shunt the lowest prioritized data stream (FIG. 2).

In order not to overload the network 102 with data which in any case shall be shunted at the node 106, a message is transmitted to the transmitter 105 (the computer) that it shall stop transmitting the data stream with the lowest priority. The message also contains the following instructions which are executed in all nodes (e.g., nodes 107 and 104) on the path to the transmitter 105:

Update the resource reservation for the data stream, i.e. keep the resourse reservations that are required to transmit the data stream.

Use the reserved resource temporarily for other traffic.

Shunt the lowest priority data stream until further notice.

Both unicast and multicast traffic may be controlled with the same signalling message. In the cases when the resources reservation is in common, all upstream nodes must shunt the lowest priority data streams as this request is forwarded in the common reservation. Consequently the data streams will not always be shunted in the nodes 104 where the resource reservation is in common.

Eventually, the bandwidth increases and the node 106 closest to the radio channel decides that the data stream of the lowest priority again can now be received.

Then, a second message is transmitted to the transmitter 105 that the data stream of the lowest priority may again transmitted.

The second message which is transmitted to the transmitter 105 contains the following information which is executed in all nodes 107 and 104 on the path to the transmitter 105.

Update the resource reservation for the data stream, i.e. keep the resourse reservations which are required to transmit the data stream.

Use the reserved resource for the originally intended data stream.

Having generally described this invention, a further understanding can be obtained by reference to certain specific examples which are provided herein for purposes of illustration only and are not intended to be limiting unless otherwise specified.

What is claimed is:

1. A data and telecommunications transmission method configured to transmit a plurality of data streams between a receiving terminal and a transmitting terminal via at least one fixed network and another network, the another network comprising links with variable bandwidth and quality, and the fixed network being controlled by a resource reservation protocol, the method comprising:

updating a specific resource reservation corresponding to a specific data stream at an upstream node in the fixed network when a downstream node of the another network is unable to maintain a predetermined transmission quality for the specific data stream;

shunting temporarily the specific data stream at the upstream node; and utilizing temporarily the specific resource reservation at the upstream node for other traffic while still maintaining the correspondence of the specific resource reservation and the specific data stream for future reactivation.

2. The method according to claim 1, further comprising:

updating the specific resource reservation corresponding to the specific data stream at the upstream node in the fixed network when the downstream node of the another network is once again able to maintain the predetermined transmission quality for the specific data stream;

canceling the shunting of the specific data stream at the upstream node; and utilizing the specific resource reservation at the upstream node for the specific data stream.

3. The method according to claim 1, said another network comprising:

a radio network including a radio channel.

4. The method according to claim 3, further comprising:

using an interface between the downstream node and the radio channel to set a limit regarding a total number of data streams that can be transmitted from the transmitting terminal to the receiving terminal.

5. The method according to claim 1, further comprising using hierarchical coding to prioritize the plurality of data streams.

6. The method according to claim 1, further comprising controlling the temporary reallocation of resources in the fixed network so that, when multicast traffic is being transmitted, the specific data stream in the upstream node is shunted without affecting other receiving terminals of the multicast traffic.

7. The method according to claim 4, wherein said using an interface comprises:

receiving and processing momentary information about a transmission capacity of the radio channel.

* * * * *